W. R. McCARROLL.
HOG YOKE.
APPLICATION FILED AUG. 12, 1910.

974,901.

Patented Nov. 8, 1910.

WITNESSES:
L. E. Noack.

INVENTOR
W. R. McCarroll,
BY
ATTORNEYS

UNITED STATES PATENT OFFICE.

WILLIAM R. McCARROLL, OF HEDLEY, TEXAS.

HOG-YOKE.

974,901. Specification of Letters Patent. Patented Nov. 8, 1910.

Application filed August 12, 1910. Serial No. 576,889.

*To all whom it may concern:*

Be it known that I, WILLIAM R. McCARROLL, citizen of the United States, residing at Hedley, in the county of Donley and State of Texas, have invented certain new and useful Improvements in Hog-Yokes, of which the following is a specification.

My invention relates to new and useful improvements in hog yokes.

The object of my invention is to provide a hog yoke which can quickly be attached to any hog and one which will prevent a hog wearing such a yoke from going through or under a fence of the ordinary construction.

Another object of my invention is to provide a hog yoke which will prevent the animal wearing the same from rooting or digging up the soil in the pen in which he is confined.

Finally the object of the invention is to provide means of the character described that will be strong, durable, efficient, and easy of operation, simple and comparatively inexpensive to construct, and also in which the several parts will not be likely to get out of working order.

Figure 1:
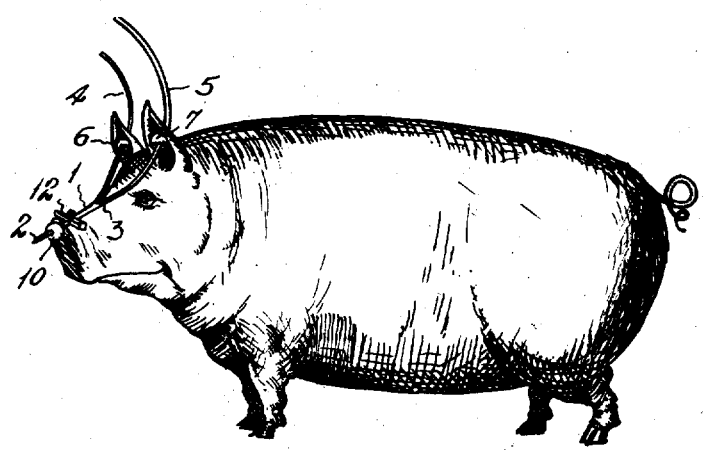
Figure 2:
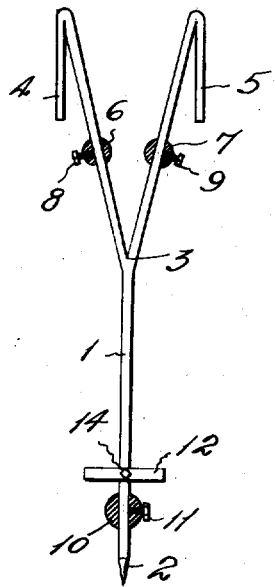

With the above and other objects in view, the invention has relation to certain novel features of construction and operation, an example of which is described in this specification and illustrated in the accompanying drawings, wherein:

Figure 1. is a perspective view of my device showing the same in position on a hog's nose, and Fig. 2. is a plan view of my device.

In the drawings, the numeral 1 designates a rod made of suitable material and has one end reduced at 2 to allow the rod to be passed through the nose of the hog to which it is desired to attach the yoke. The other end of the rod 1 supports at 3 diverging prongs 4 and 5 which extend upwardly and terminate at a point over the snout of the hog after passing through his ears. Balls 6 and 7 have been placed on these prongs and are provided with set screws 8 and 9 to allow a sliding adjustment of the ball on the arms 4 and 5. A similar ball 10 having a set screw 11 threaded therein is arranged to be slipped onto the rod 1 after the same has been passed through the snout of the hog and to be held in position by the set screw 11. A cross bar 12 is also mounted on the rod 1 and arranged to be held in a horizontal position just beyond the point where the rod 1 passes through the snout of the hog by a set screw 14.

The prongs 4 and 5 are suitably passed through the ears of the hog and the balls 6 and 7 are arranged to be slid along the prongs to allow the same to be passed through the ears of the hog, but after the prongs 4 and 5 have been passed through the ears and the rod 1 has been passed through the snout, the balls 6 and 7 should be set on the prongs so that they will rest within the ears of the hog, while the cross bar 12 and the ball 10 should be adjusted on the rod 1 to prevent a longitudinal movement of the same through the snout of the hog.

It is obvious that while the prongs 4 and 5 will prevent the hog equipped with such a hog yoke from passing beneath a fence of the ordinary wire construction the cross bar 12 would prevent him from going between the palings of another fence and the point 2 on the rod 1 would engage in the soil and prevent the hog from rooting under either style of fence. The least pressure placed on the end of the prongs 4 and 5 by coming in contact with a fence or other obstacle will cause the balls 6, 7 and 10 to engage with the hog's snout and ears and render his efforts painful if he should persist in attempting to force his way through or under a fence.

What I claim is:

1. In a hog yoke, a rod adapted to be passed through the snout of a hog, a bar supported by the rod at a point above the hog's snout, a ball provided with a set screw arranged to engage over one end of the rod after the same has been passed through the snout of a hog, upwardly extending prongs having connection with the other end of the rod arranged to pass through the ears of the hog, and balls provided with set screws fixed to slide on said prongs and arranged to normally rest in front of the ears of the hog.

2. In a hog yoke, a rod adapted to be passed through the snout of a hog, a horizontal cross bar arranged on the rod adapted to have a sliding adjustment thereon, prongs diverging from one end of the rod and extending through the ears of the hog in an upward direction, a ball arranged to slide over the end of the rod and to rest in front of the hog's snout, a set screw arranged to hold said ball in position, and balls mounted on the prongs adapted to be fixed thereon to prevent the same from sliding through the ears of the hog.

3. In a device of the character described, the combination with a rod adapted to be passed through the snout of a hog, of a cross bar mounted on the rod adapted to have a sliding adjustment, a ball arranged to engage over the end of the rod after the same has been passed through the snout of the hog, and prongs extending from the rearmost extremity of the rod through the ears of the hog.

4. A device of the character described, comprising a rod adapted to be passed through the nose of an animal, a knob adapted to be fixed on one end of said rod, a cross bar supported on the rod above the nose of the animal and arranged to have a sliding adjustment on the rod, prongs supported at the rearmost extremity of the rod adapted to be passed through the ears of the animal, and knobs arranged on said prongs adapted to be held against the ears of the animal.

In testimony whereof I have signed my name to this specification in the presence of two subscribing witnesses.

WILLIAM R. McCARROLL.

Witnesses:
SAM A. McCARROLL,
G. A. WINCHES.